US011099078B1

(12) United States Patent
Littrell et al.

(10) Patent No.: US 11,099,078 B1
(45) Date of Patent: Aug. 24, 2021

(54) ACOUSTIC SENSOR WITH TEMPERATURE STRUCTURE

(71) Applicant: Vesper Technologies, Inc., Boston, MA (US)

(72) Inventors: Robert Littrell, Boston, MA (US); Yu Hui, Boston, MA (US); Craig Core, Boston, MA (US); Ronald Gagnon, Boston, MA (US)

(73) Assignee: Vesper Technologies, Inc., Boston, MA (US)

( * ) Notice: Subject to any disclaimer, the term of this patent is extended or adjusted under 35 U.S.C. 154(b) by 346 days.

(21) Appl. No.: 16/110,528

(22) Filed: Aug. 23, 2018

Related U.S. Application Data (60) Provisional application No. 62/550,218, filed on Aug. 25, 2017.

(51) Int. Cl.
| | | |
|---|---|---|
| *G01K 1/14* | (2021.01) | |
| *G01K 1/08* | (2021.01) | |
| *G01K 13/00* | (2021.01) | |
| *G01K 7/00* | (2006.01) | |
| *G01K 11/22* | (2006.01) | |
| *G01K 7/18* | (2006.01) | |
| *G01H 3/00* | (2006.01) | |

(52) U.S. Cl.
CPC ............... *G01K 1/14* (2013.01); *G01H 3/00* (2013.01); *G01K 7/18* (2013.01)

(58) Field of Classification Search
USPC ............................... 374/142, 117, 185, 208
See application file for complete search history.

(56) References Cited

U.S. PATENT DOCUMENTS

| | | | | |
|---|---|---|---|---|
| 7,192,819 | B1 * | 3/2007 | Padmanabhan | B81C 1/00158 257/19 |
| 2011/0150030 | A1 * | 6/2011 | Abdelmoneum | G01K 7/32 374/117 |
| 2014/0140364 | A1 * | 5/2014 | Charles | G01K 15/005 374/1 |
| 2015/0280686 | A1 * | 10/2015 | Robinson | H03B 5/326 310/321 |
| 2016/0165330 | A1 * | 6/2016 | Minervini | G01K 13/00 374/142 |
| 2017/0026730 | A1 * | 1/2017 | Albers | H04R 1/04 |
| 2017/0238107 | A1 * | 8/2017 | Walther | G01K 7/028 381/58 |
| 2018/0024010 | A1 * | 1/2018 | Nakagawa | G01K 7/02 374/135 |

* cited by examiner

*Primary Examiner* — Mirellys Jagan
(74) *Attorney, Agent, or Firm* — Nutter McClennen & Fish LLP (57) ABSTRACT

An acoustic sensor has a MEMS die with MEMS structure. Among other things, the MEMS structure includes a diaphragm configured to mechanically respond to incident acoustic signals, and a temperature sensor member configured to detect temperature.

31 Claims, 6 Drawing Sheets

ACOUSTIC SENSOR WITH TEMPERATURE STRUCTURE

PRIORITY

This patent application claims priority from provisional U.S. patent application No. 62/550,218, filed Aug. 25, 2017, entitled, "ACOUSTIC SENSOR WITH TEMPERATURE STRUCTURE," and naming Robert Littrell, Yu Hui, Craig Core, and Ronald Gagnon as inventors, the disclosure of which is incorporated herein, in its entirety, by reference.

FIELD OF THE INVENTION

Various embodiments of the invention generally relate to acoustic sensors and, more particularly, the various embodiments of the invention relate to acoustic sensors with integrated temperature detection functionality.

BACKGROUND OF THE INVENTION

A micro-electro-mechanical system (MEMS) acoustic transducer/sensor converts acoustic energy into electrical signal, and/or converts an electrical signal into acoustic energy. An example of a MEMS acoustic transducer is a MEMS microphone, which converts sound pressure into an electrical voltage. Based on their transduction mechanisms, MEMS microphones can be made in various forms, such as capacitive microphones or piezoelectric microphones.

MEMS capacitive microphones and electret condenser microphones (ECMs) currently dominate the consumer electronics. Piezoelectric MEMS microphones, however, occupy a growing portion of the consumer market, and have unique advantages compared to their capacitive counterparts. Among other things, piezoelectric MEMS microphones do not have a back plate, eliminating the squeeze film damping, which is an intrinsic noise source for capacitive MEMS microphones. In addition, piezoelectric MEMS microphones are reflow-compatible and can be mounted to a printed circuit board (PCB) using typical lead-free solder processing, which could irreparably damage typical ECMs.

Summary of Various Embodiments

In accordance with one embodiment of the invention, an acoustic sensor has a MEMS die with MEMS structure. Among other things, the MEMS structure includes a diaphragm configured to mechanically respond to incident acoustic signals, and a temperature sensor member configured to detect temperature.

The temperature sensor member can include a resistor that cooperates with temperature circuitry to detect its resistance. Preferably, this resistance is configured to vary, in a known manner, as a function of the temperature of the resistor. Those skilled in the art may use a number of different circuit arrangements to detect these known resistance changes. To that end, the temperature circuitry may include a Wheatstone Bridge.

The temperature sensor member may be formed from any of a number of materials. For example, the temperature sensor member resistor may be formed from a metal, such as at least one of molybdenum, platinum, aluminum, aluminum-copper, and nickel. As another example, the temperature sensor member may be formed from a non-metal, such as doped polysilicon.

The diaphragm can be contiguous with the temperature sensor member. For example, the diaphragm may structurally include the temperature sensor member. In that case (and in other cases), one or both of the diaphragm and temperature sensor member forms a cantilever. Moreover the diaphragm may include piezoelectric material configured to produce a signal when actuated. In fact, the temperature sensor member also may include that same piezoelectric material. Among other things, the piezoelectric material may include at least one of aluminum nitride, aluminum scandium nitride, zinc oxide, and lead zirconate titanate.

The acoustic sensor also may have a package forming an interior chamber with an aperture. As such, the MEMS die preferably is mounted within the interior chamber and adjacent to the aperture to receive incoming acoustic signals. For example, the MEMS die may be positioned so that the temperature sensor member and/or the diaphragm is/are directly exposed to and across from the aperture. The aperture in turn exposes the interior chamber to the environment external to the interior chamber.

In accordance with another embodiment, a method of sensing temperature provides a MEMS die having MEMS structure including a diaphragm configured to mechanically respond to incident acoustic signals. The MEMS structure further includes an electrically conductive temperature sensor member configured to detect temperature. The method directs a signal through the temperature sensor member, detects a response signal produced by directing the signal through the temperature sensor member, and determines temperature as a function of the response signal.

In accordance with other embodiments, a MEMS sensor has a substrate and MEMS structure. The MEMS structure includes a diaphragm configured to mechanically respond to incident acoustic signals. The diaphragm has an electrically conductive electrode for interfacing with external devices, and is coupled to the substrate in a cantilevered manner. The MEMS structure also includes a temperature sensor member configured to detect temperature. Preferably, the MEMS sensor also includes temperature circuitry configured to cooperate with the temperature sensor member to detect a property of the temperature sensor member in response to temperature.

The MEMS sensor of claim may include a first die having the substrate and MEMS structure, and a second die having the temperature circuitry. In other embodiments, however, a single die may include the substrate, the MEMS structure, and the temperature circuitry.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE EMBODIMENTS

In illustrative embodiments, a packaged acoustic sensor die has integrated temperature sensor structure that may more easily detect temperatures external to its package. To that end, the acoustic sensor die may include a piezoelectric diaphragm with the noted integral temperature sensor structure. Details of various embodiments are discussed below.

Figure 1:
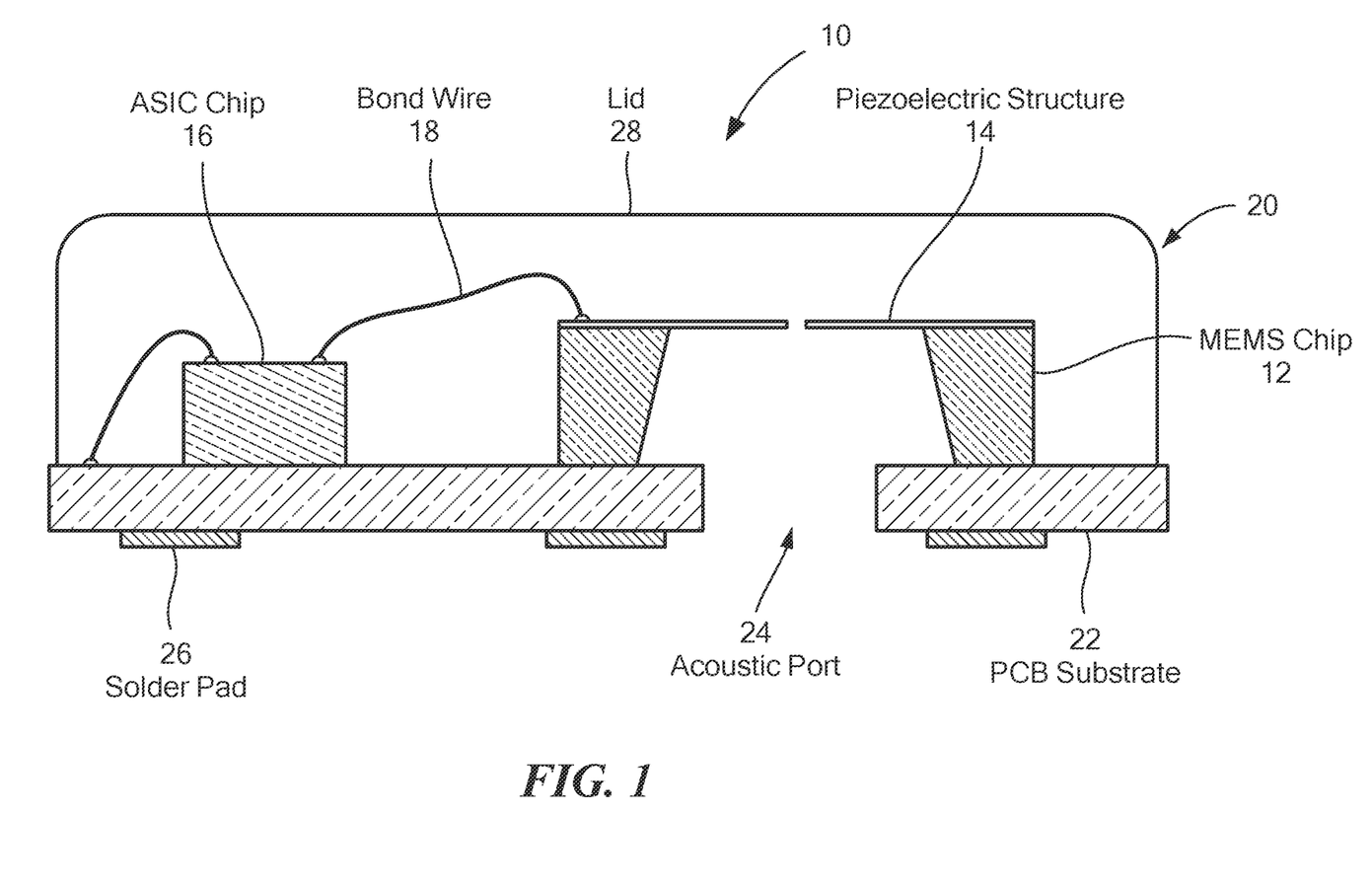
FIG. 1 schematically shows a cross-sectional view of a MEMS acoustic sensor that may implement illustrative embodiments of the invention.

FIG. 1 schematically shows an acoustic sensor 10 implemented as a typical piezoelectric MEMS microphone 10. Indeed, those skilled in the art may implement the acoustic sensor 10 as other types of sensing devices, such as speakers or other types of transducers. As shown in this example, the MEMS microphone 10 of FIG. 1 includes a MEMS chip/die 12 having piezoelectric structures 14, e.g. cantilevers or diaphragms, to convert sound pressure into an electrical signal, and an application-specific integrated circuit (ASIC) chip/die to buffer and amplify the electrical signal generated by the MEMS die 12. The MEMS dies 12 and ASIC die 16 are electrically connected by wire bonds 18, and mounted within an interior chamber formed by a package 20. Alternatively, a single chip/die may integrate both the MEMS die 12 and ASIC die 16 functionality. As such, a single die may include the piezoelectric structures 14 and other structures of the MEMS die 12, and the amplification and signal processing functions of the ASIC die 16 (e.g., temperature sensing functionality, discussed below).

The package 20 has a substrate 22 (e.g., a printed circuit board) that forms an acoustic port/aperture 24 for enabling sound pressure to access the MEMS die 12, and multiple solder pads 26 for users to solder the microphone package 20 onto their boards. A metal lid 28 is typically used to form a housing for the microphone die to mitigate electromagnetic interference (EMI).

As noted, the MEMS die 12 may be formed from one or more piezoelectric cantilevers 30 or diaphragms. Cantilever based piezoelectric structure is preferable in many cases as it typically is stress free after the MEMS die 12 is released during fabrication. On the other hand, the diaphragm structure of such a microphone 10 typically requires more stress control in the fabrication process as minimal residual stress within the diaphragm can result in significant sensitivity degradation. Multiple cantilevers 30 can be arranged to form a piezoelectric sensing structure, e.g. a square shape, a hexagon shape, an octagon shape, or some other shape.

Figure 2:
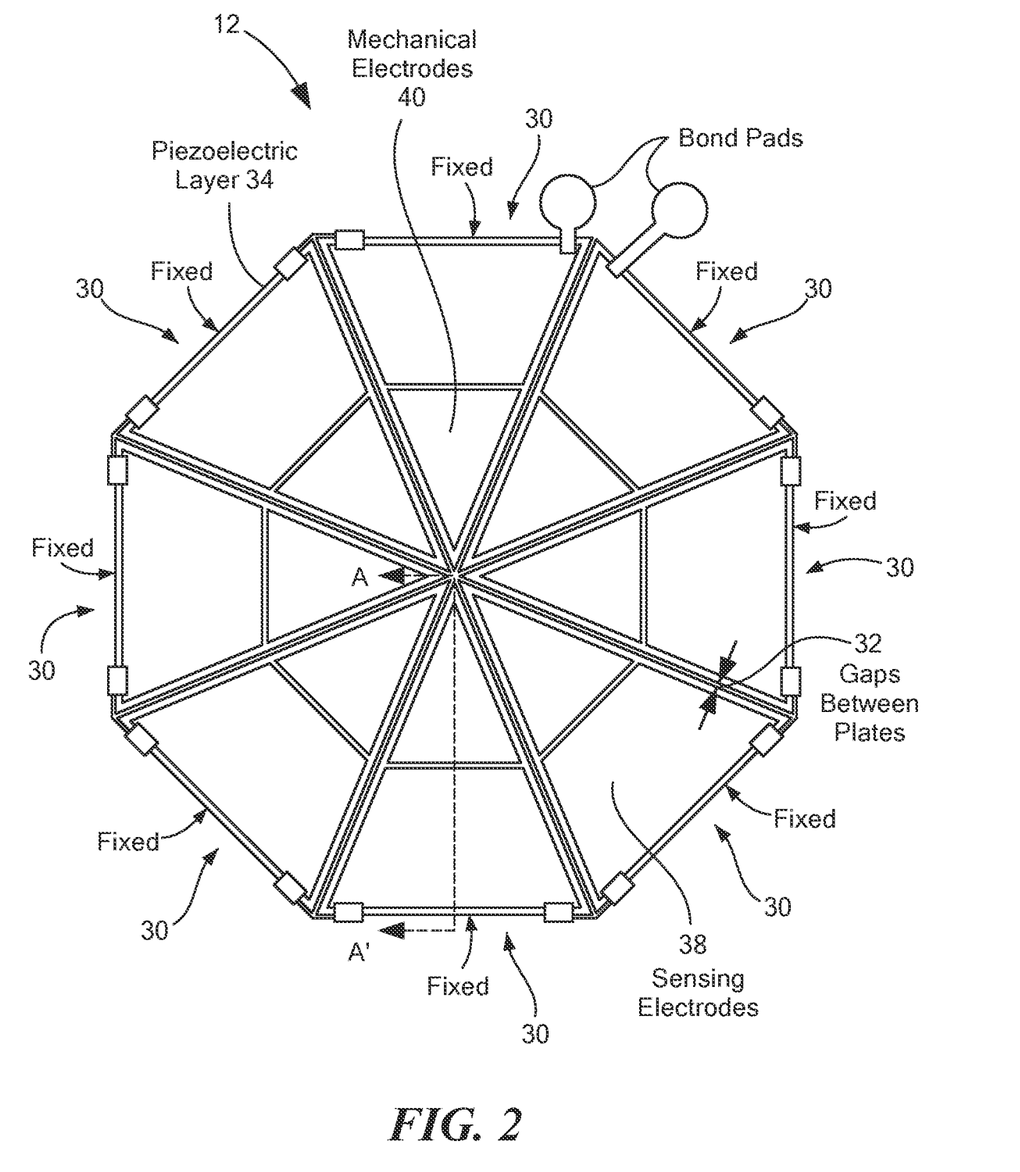
FIG. 2 schematically shows a plan view of a generic piezoelectric MEMS acoustic sensor die.
Figure 3:
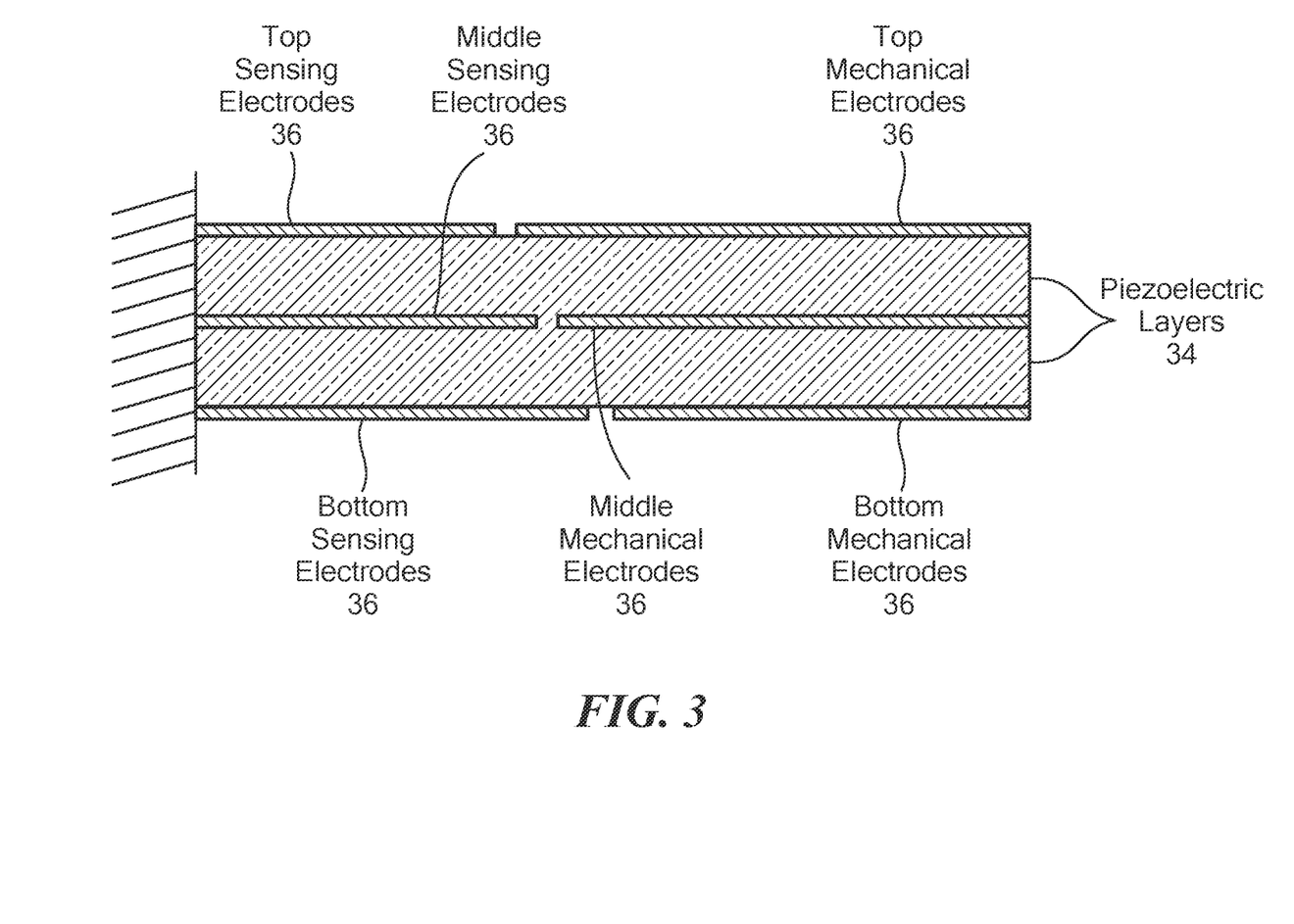
FIG. 3 schematically shows a cross-sectional view of a cantilever member of the MEMS acoustic sensor die across line A-A' of FIG. 2.

FIG. 2 schematically shows a plan view of an exemplary microphone die using eight piezoelectric triangular cantilevers 30 that together from an octagon MEMS acoustic senor. FIG. 3 shows a cross-sectional view of one of those cantilevers 30. Indeed, some embodiments may use more or fewer cantilevers 30. Accordingly, as with other features, discussion of eight cantilevers 30 is for illustrative purposes only. These triangular cantilevers 30 are fixed to a die substrate (e.g., a silicon substrate) at their respective bases and are configured to freely move in response to incoming/incident sound pressure. Triangular cantilevers 30 are preferable to rectangular ones as they form a gap controlling geometry. Specifically, when the cantilevers 30 bend up or down due to either sound pressure or residual stress, gaps 32 between adjacent cantilevers 30 typically remain relatively small and are well controlled.

The cantilever 30 can be fabricated by one or multiple layers of piezoelectric material 34 sandwiched by top and bottom metal electrodes 36. FIG. 3 schematically shows this structure. The piezoelectric layers 34 can be made by piezoelectric material typically used in MEMS devices, such as one or more of aluminum nitride (AlN), aluminum scandium nitride (AlScN), zinc oxide (ZnO), and lead zirconate titanate (PZT). The electrodes 36 can be made by typical metal materials used in MEMS devices, such as one or more of molybdenum (Mo), platinum (Pi), nickel (Ni) and aluminum (Al). Alternatively, the electrodes 36 can be formed from a non-metal, such as doped polysilicon. These electrodes 36 can cover only a portion of the cantilever 30, e.g., from the base to about one third of the cantilever 30, as these areas generate electrical energy more efficiently within the piezoelectric layer than the areas near the free end. Specifically, high stress concentration in these areas near the base induced by the incoming sound pressure is converted into electrical signal by direct piezoelectric effect.

Figure 4:
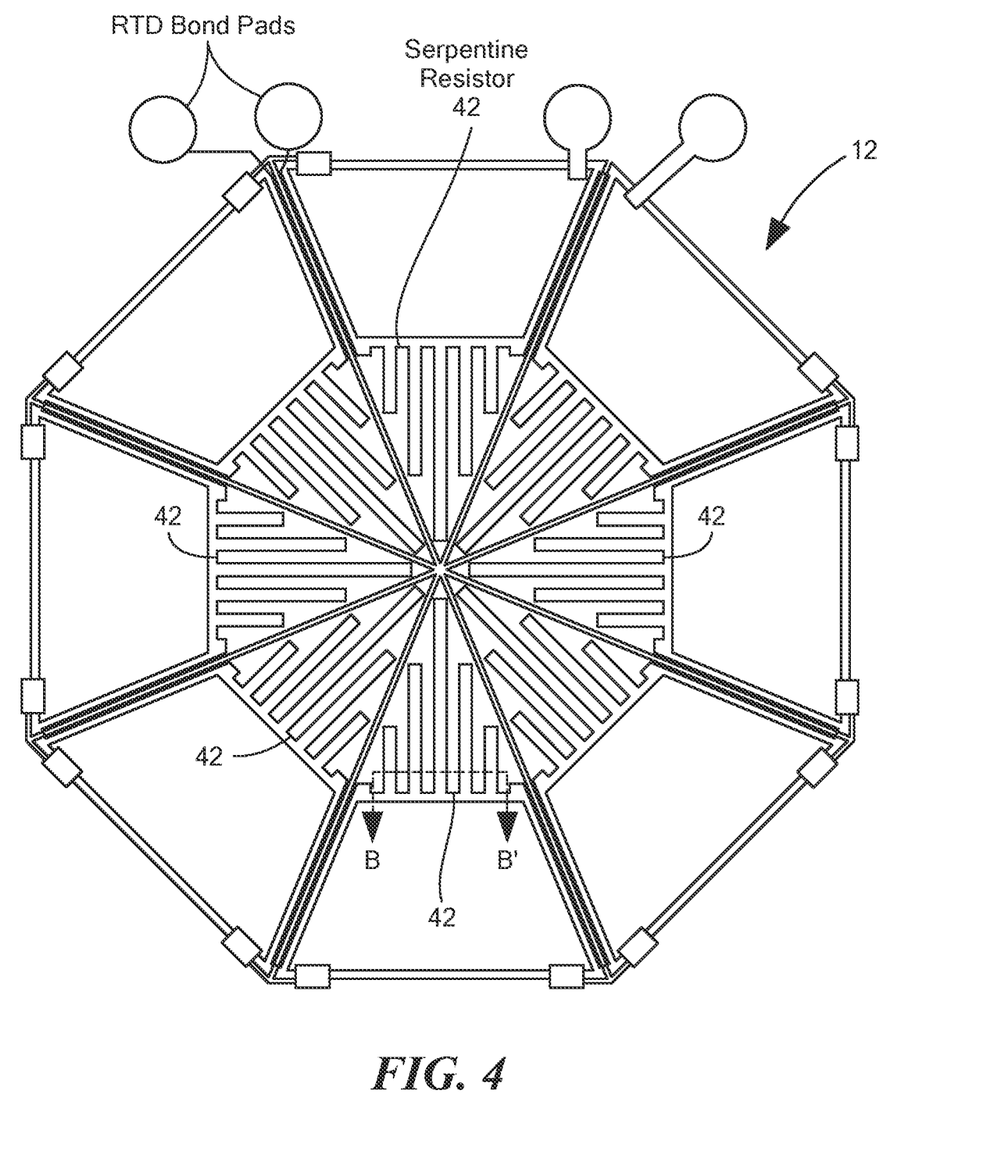
FIG. 4 schematically shows a plan view of a MEMS acoustic sensor die that may implement illustrative embodiments of the invention.
Figure 5:
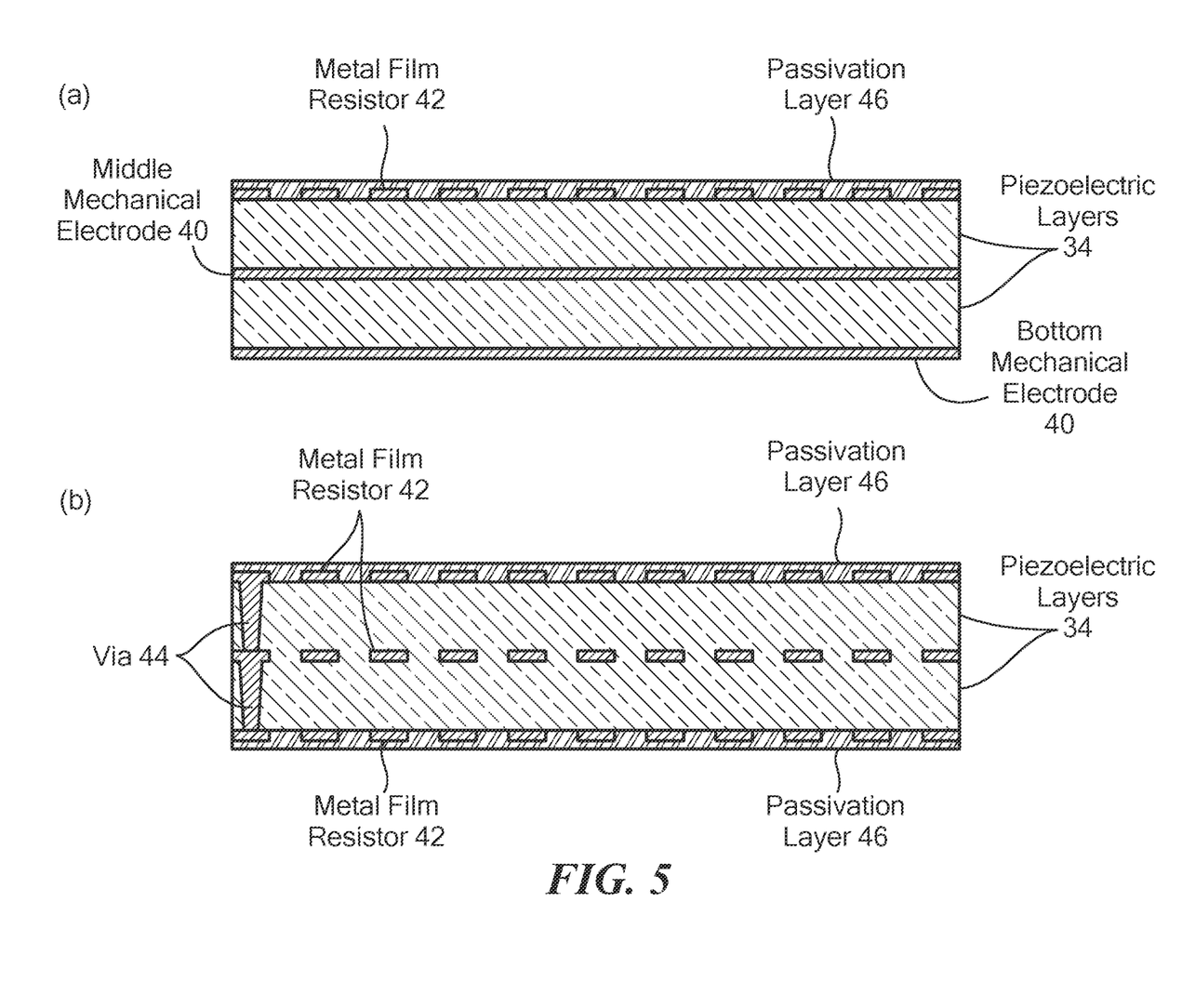
FIG. 5 schematically shows a cross-sectional view of resistors across line B-B' of FIG. 4 in accordance with illustrative embodiments of the invention.

The electrodes 36 are referred to as "sensing electrodes 38," which are connected in series to achieve the desired capacitance and sensitivity values. In addition to the sensing electrodes 38, the rest of the cantilever 30 also may be covered by metal to maintain certain mechanical strength of the structure. However, this metal, referred to as "mechanical electrodes 40," does not contribute to the electrical signal of the microphone die output. The inventors discovered, however, that these mechanical electrodes 40 can be functionalized to serve another purpose—to sense environmental temperatures. To that end, as shown in FIGS. 4 and 5, the inventors modified and functionalized the mechanical electrodes 40 to include a resistive temperature detector (RTD).

To those ends, in illustrative embodiments, one, more than one, or all of the cantilevers 30 are modified to include a temperature sensor structure/member 42. In this example, the temperature sensor member 42 comprises resistors 42 on each cantilever 30. Preferred embodiments form those resistors 42 by patterning the metal of the mechanical electrodes 40 into serpentine shaped resistors 42—i.e., temperature sensing member 42. Each cantilevered diaphragm 30 preferably has these serpentine shaped resistors 42. As such, some embodiments may be considered to have diaphragms 30 that each has a temperature sensor structure. These separated resistors 42 from individual cantilevers 30 connected in series to form one resistor 42 with an effective resistance that is a function of the length and width of the serpentine metal line(s).

The inventors also recognized that proper selection of the resistor material can enable effective and efficient temperature sensing. Specifically, the is temperature of the environment (preferably external to the package 20) is sensed by the temperature dependence of the resistance of the metal, which is typically characterized by the temperature coefficient of resistivity (TCR). This resistivity change induced by the temperature change results in an overall resistance change, which can be readily detected by measuring circuits (e.g., in the ASIC die 16).

Other embodiments may integrate some or all of the temperature sensing structure 42 into another part of the MEMS die 12. For example, the temperature sensor may be formed adjacent to the diaphragms 30, on another part of the diaphragms 30, or distributed about both the diaphragms 30 and other parts of the MEMS die 12.

Integrating the temperature sensing structure 42 into the piezoelectric MEMS microphone die 12 has a number of benefits. For example, the temperature sensing element 42 now can be directly exposed to the environment through the acoustic port 24 in the package 20. This enables the sensor 10 to directly detect the environmental temperature. In contrast, temperature sensors embedded in integrated circuits (e.g., in a separate ASIC) generally can only sense the temperatures locally concentrated within the IC die. This undesirably can produce inaccurate measurements because the temperature of the IC die may be influenced by self-heating, or thermal conduction from copper traces in an underlying printed circuit board.

As noted above, FIG. 4 shows a plan view of such a metal film RTD integrated in a piezoelectric MEMS microphone die in accordance with illustrative embodiments. In this case, the serpentine resistor 42 is formed from the top metal. FIG. 5 shows two views:

(a) the cross-sectional view of the structure, and
(b) a cross-sectional view using all the three metal layers to build the resistors 42, which are interconnected by vias 44.

Accordingly, more than one metal electrode layer 40 (e.g., two or all the three metal layers 40) can be used to build the resistors 42, depending on the desired resistance. In fact, some embodiments use just a single layer, and that layer may be the top or bottom layers.

More specifically, FIG. 5 shows two cross-sectional views of the metal film resistor 42 from the B-B' cut shown in FIG. 4: (a) top mechanical electrode 40 used to build the metal film resistor 42 with a passivation layer 46 covering it; (b) all three layers of mechanical electrodes 40 used to build the metal film resistor 42 and interconnected by vias 44. Two passivation layers 46 are covered on top and bottom of the stack. These passivation layers 46 protect the metal film from oxidation or contamination, and can be made of the same piezoelectric material 34 as the MEMS die 12, or other typical dielectric materials used in MEMS devices, e.g. silicon dioxide or silicon nitride.

In this example, the metal serpentine resistors 42 are aligned longitudinally to the length of the cantilever 30. However, different orientations can be implemented depending on the design and layout requirements. The metal used in this example is 20 nanometer thick molybdenum. Alternatively, as noted above, some embodiments use different metals (e.g. Pt, Ni, and Al) with various thicknesses (e.g. several nanometers to hundreds of nanometers). Like the thicknesses, the width and spacing of the serpentine metal line may be selected as required by the application. For example, the width and spacing of the metal lines may be 6 nanometers. Again, different sizes of the metal resistor lines 42 can be designed according to the required resistance value. Based on a typical sheet resistance value of 5 ohms per square for molybdenum in this thickness range, a serpentine molybdenum resistor 42 implemented using these dimensions can achieve a resistance value of 2.5 kiloohms for one triangular cantilever 30. Connecting all 8 resistors 42 on the eight cantilevers 30 thus produces one resistor 42 whose resistance is 20 kiloohms. Considering a typical TCR value of $5.0\times10^{-3}$ 1/° C. for molybdenum in the temperature range from −50° C. to 200° C., a one degree change in temperature can induce a resistance change of 100 ohms, which is readily detected by a measuring circuit.

Indeed, it should be reiterated that these values, such as thicknesses, spaces, temperatures, etc. are illustrative and not intended to limit various embodiments of the invention. Those skilled in the art can select other values to satisfy their requisite specifications and requirements. In a similar manner, those skilled in the art may use other types of resistors 42, such as those that are not serpentine, or those that are positioned at a different location on the MEMS die 12. In fact, some embodiments may apply to non-piezoelectric acoustic sensors, such as condenser microphones and others discussed above.

The resistance change induced by the environmental temperature change can be readily measured and read out by the same ASIC die 16 for the overall microphone 10. Alternatively, that resistance change may be read out by another die, or by circuitry directly integrated into the MEMS die 12. Those skilled in the art can select the appropriate arrangement for their specific application.

Figure 6:
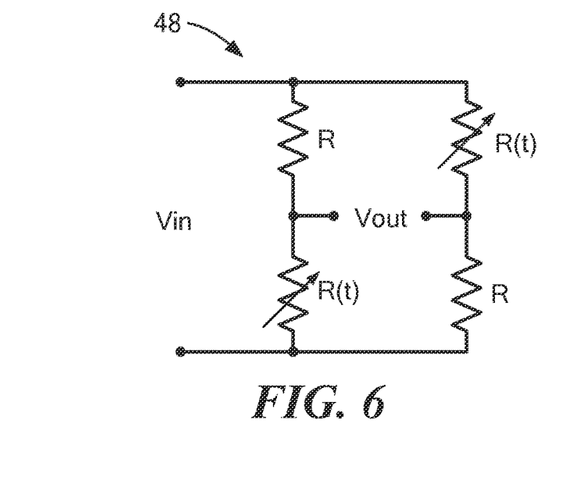
FIG. 6 schematically shows an exemplary Wheatstone Bridge that may measure temperature change in accordance with illustrative embodiments of the invention.

One way to measure resistance change simply applies a constant voltage across the resistor 42 and monitors the output current through the resistor 42 Another way applies a constant current through the resistor 42 and monitors the output voltage across the resistor 42 An illustration of another resistance measuring circuit is shown in FIG. 6.

Specifically, FIG. 6 schematically shows a Wheatstone Bridge circuit 48 formed by two temperature sensitive metal film resistors 42 on the MEMS die 12, R(t), and two constant resistors R, with resistances that are substantially not affected by anticipated temperatures in the given application. These two constant resistors R can be formed in the ASIC die 16 and trimmed to the desired value. At reference temperature, e.g. room temperature, the four resistors R and R(t) may have the same resistance value, R, so that the output voltage Vout is 0 V. When the room temperature changes, e.g., a small temperature rise of $\Delta T$, the output voltage is V_out=0.5V_in $\alpha\Delta T$, where a is the TCR of the metal film resistor 42. For example, when considering a typical TCR value of $5.0\times10^{-3}$ 1/° C. for molybdenum, a supply voltage of 1V and temperature change of 1° C. can result in an output voltage of 2.5 mV.

The monitoring circuits mentioned above can be measured by a voltage amplifier that provides a buffered resistance measurement. Gain can be programmed with this amplifier to determine the overall temperature measurement dynamic range. For example, using the 2.5 mV/° C. device illustrated above, with a Gain=3 V/V and a 1.0V Supply Range, the dynamic range would be 133° C. Further, this voltage amplifier output can be digitized using an analog-to-digital converter ("ADC"), such as a successive-approximation converter. The output of the ADC can be saved into memory and later communicated by means of an I2C, SPI, or other digital communications protocol bus, to the system at large.

Any imbalance in the bridge, which would result in a temperature offset due to resistance differences between the resistors R and R(T), can be trimmed by the ASIC die 16 by monitoring the measurement output and adjusting the value of R until the output is zero. Each static resistor R as shown in FIG. 6 can be independently trimmed. This trimming operation could be controlled through the same interface used to read out the ADC output.

Figure 7:
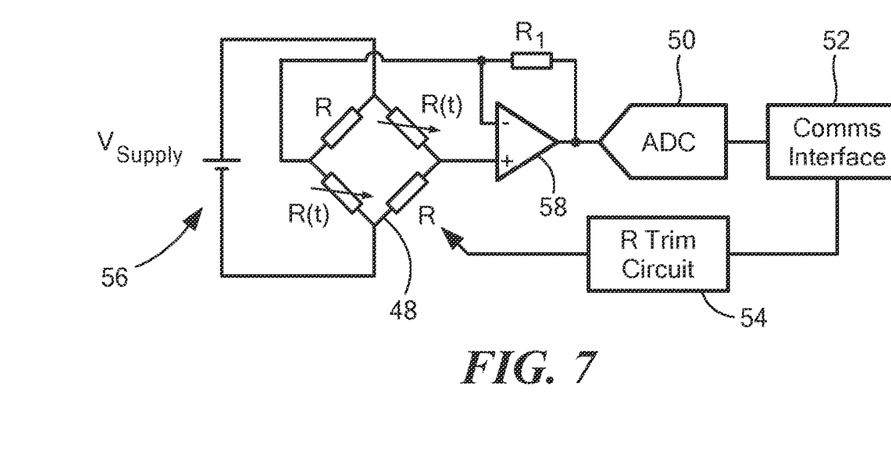
FIG. 7 schematically shows an example of a measurement circuit utilizing a Wheatstone Bridge, and providing a digital output, bridge trim, and system interface.

FIG. 7 schematically shows an example of the system block diagram internal to the ASIC. Rf may be selected to achieve the proper gain required, i.e., Gain=3V/V as depicted above, and is dependent on the absolute values of Resistors R and R(t). As shown, this system also has the noted ADC 50, a communication interface 52, a resistor trim circuit 54, a supply voltage 56, and an amplifier 58 that cooperate to produce the desired results.

Figure 8:
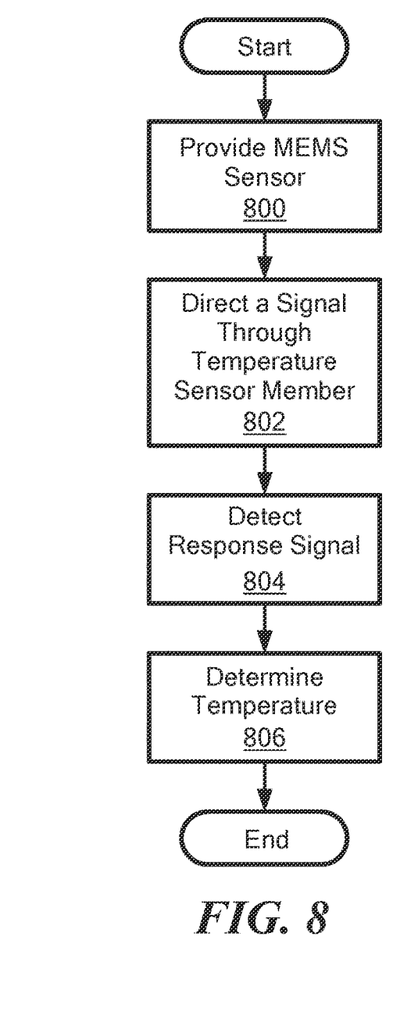
FIG. 8 shows a method of detecting temperature in accordance with illustrative embodiments of the invention.

FIG. 8 shows a process of detecting temperature in accordance with illustrative embodiments of the invention. It should be noted that this process is simplified from a longer process that normally would be used to detect temperature. Accordingly, the process of detecting temperature may have many steps that those skilled in the art likely would use. In addition, some of the steps may be performed in a different order than that shown, or at the same time. Those skilled in the art therefore can modify the process as appropriate.

The process of FIG. 8 begins at step 800, which provides a MEMS sensor. Among others, this step preferably provides a MEMS sensor as discussed above. Next, step 802 directs a signal though the temperature sensor member. As noted above, this signal may include a current through the temperature sensor member, or a voltage applied across the temperature sensor member 42. These signals may be constant, variable, or some other signal type. Accordingly, this signal across the temperature sensor member 42 produces a response signal. For example, if the signal is a voltage, then the response signal may be a current that varies with temperature.

Next, step 804 detects the response signal, and step 806 determines the temperature based on the response signal. To those ends, illustrative embodiments may use a signal measurement circuit, such as those discussed above (e.g., the Wheatstone Bridge circuit 48), to detect the response signal and, using the response signal, determine the temperature.

Although the above discussion discloses various exemplary embodiments of the invention, it should be apparent that those skilled in the art can make various modifications that will achieve some of the advantages of the invention without departing from the true scope of the invention.

What is claimed is:

1. An acoustic sensor comprising:
   a MEMS die having a MEMS structure,
   the MEMS structure including a diaphragm configured to mechanically respond to incident acoustic signals,
   the MEMS structure including a temperature sensor member configured to detect temperature,
   a package forming an interior chamber with an aperture, the MEMS die being mounted within the interior chamber and adjacent to the aperture to receive incoming acoustic signals,
   the aperture exposing the interior chamber to the environment external to the interior chamber, and
   the MEMS die being positioned so that the temperature sensor member is directly exposed to and across from the aperture.

2. The acoustic sensor of claim 1, wherein the diaphragm is contiguous with the temperature sensor member.

3. The acoustic sensor of claim 1, wherein the diaphragm includes the temperature sensor member.

4. The acoustic sensor of claim 1, wherein one or both of the diaphragm and temperature sensor member form a cantilever.

5. The acoustic sensor of claim 1, wherein the temperature sensor member comprises a resistor formed from metal.

6. The acoustic sensor of claim 5, wherein the metal includes at least one of molybdenum, platinum, aluminum, aluminum-copper, and nickel.

7. The acoustic sensor of claim 1, wherein the temperature sensor member comprises a resistor formed from a non-metal.

8. The acoustic sensor of claim 7, wherein the non-metal comprises doped polysilicon.

9. The acoustic sensor of claim 1, wherein the diaphragm includes piezoelectric material to produce a signal when actuated.

10. The acoustic sensor of claim 9, wherein the temperature sensor member includes the piezoelectric material.

11. The acoustic sensor of claim 9, wherein the piezoelectric material includes at least one of aluminum nitride, aluminum scandium nitride, zinc oxide, and lead zirconate titanate.

12. The acoustic sensor of claim 1, wherein the temperature sensor member comprises a resistor having a resistance.

13. The acoustic sensor of claim 12, further including temperature circuitry configured to cooperate with the resistor to detect the resistance of the resistor, the resistance configured to vary as a function of the temperature of the resistor.

14. The acoustic sensor of claim 13, wherein the temperature circuitry comprises a Wheatstone Bridge.

15. An acoustic sensor comprising:
    a MEMS die having a MEMS structure,
    the MEMS structure including a diaphragm configured to mechanically respond to incident acoustic signals, and
    the MEMS structure including a temperature sensor member configured to detect temperature,
    wherein one or both of the diaphragm and temperature sensor member form a cantilever.

16. The acoustic sensor of claim 15 wherein the diaphragm is contiguous with the temperature sensor member.

17. The acoustic sensor of claim 15, wherein the diaphragm includes the temperature sensor member.

18. The acoustic sensor of claim 15, further comprising a package forming an interior chamber with an aperture, the MEMS die being mounted within the interior chamber and adjacent to the aperture to receive incoming acoustic signals, the aperture exposing the interior chamber to the environment external to the interior chamber.

19. The acoustic sensor of claim 15, wherein the temperature sensor member comprises a resistor formed from metal.

20. The acoustic sensor of claim 19, wherein the metal includes at least one of molybdenum, platinum, aluminum, aluminum-copper, and nickel.

21. The acoustic sensor of claim 15, wherein the temperature sensor member comprises a resistor formed from a non-metal.

22. The acoustic sensor of claim 21, wherein the non-metal comprises doped polysilicon.

23. The acoustic sensor of claim 15, wherein the diaphragm includes piezoelectric material to produce a signal when actuated.

24. The acoustic sensor of claim 23, wherein the temperature sensor member includes the piezoelectric material.

25. The acoustic sensor of claim 23, wherein the piezoelectric material includes at least one of aluminum nitride, aluminum scandium nitride, zinc oxide, and lead zirconate titanate.

26. The acoustic sensor of claim 15, wherein the temperature sensor member comprises a resistor having a resistance.

27. The acoustic sensor of claim 26, further including temperature circuitry configured to cooperate with the resistor to detect the resistance of the resistor, the resistance configured to vary as a function of the temperature of the resistor.

28. The acoustic sensor of claim 27, wherein the temperature circuitry comprises a Wheatstone Bridge.

29. A MEMS sensor comprising:
a substrate and MEMS structure, the MEMS structure including a diaphragm configured to mechanically respond to incident acoustic signals, the diaphragm having an electrically conductive electrode for interfacing with external devices, the diaphragm being coupled to the substrate in a cantilevered manner, the MEMS structure including a temperature sensor member configured to detect temperature; and
temperature circuitry configured to cooperate with the temperature sensor member to detect a property of the temperature sensor member in response to temperature.

30. The MEMS sensor of claim 29, further comprising a first die and a second die, the first die comprising the substrate and MEMS structure, the second die comprising the temperature circuitry.

31. The MEMS sensor of claim 30, further comprising a package containing the first and second dies, the package forming an interior chamber with an aperture, the first die being mounted within the interior chamber and adjacent to the aperture to receive incoming acoustic signals, the aperture exposing the interior chamber to the environment external to the external chamber.

\* \* \* \* \*